United States Patent [19]

Rondeau et al.

[11] Patent Number: 4,887,411
[45] Date of Patent: Dec. 19, 1989

[54] APPARATUS FOR FILLING BAGS OR POUCHES WITH A PERFUSION LIQUID

[75] Inventors: George Rondeau, Braffe, Belgium; Pierre Soubrier, Chateauneuf Sur Sarthe, France

[73] Assignee: Baxter International Inc., Deerfield, Ill.

[21] Appl. No.: 211,481

[22] Filed: Jun. 24, 1988

[30] Foreign Application Priority Data

Jun. 25, 1987 [BE] Belgium .............................. 08700702

[51] Int. Cl.⁴ .............................................. B65B 3/26
[52] U.S. Cl. ......................................... 53/493; 53/52; 53/551; 53/266 R; 141/95
[58] Field of Search ....................... 141/95; 53/493, 52, 53/77, 266 R, 451, 551, 552, 554, 555

[56] References Cited

U.S. PATENT DOCUMENTS

| | | |
|---|---|---|
| 2,869,299 | 1/1959 | Jarund . |
| 3,269,079 | 8/1966 | Schmied . |
| 3,349,859 | 10/1967 | Cox et al. . |
| 3,381,441 | 5/1968 | Condo et al. . |
| 3,491,503 | 1/1970 | Ashton et al. . |
| 3,517,688 | 6/1970 | Scholle ................................. 137/240 |
| 3,526,079 | 9/1970 | Maxeiner et al. . |
| 3,543,342 | 12/1970 | Moran et al. . |
| 3,566,575 | 3/1971 | Lisiecki . |
| 3,813,845 | 6/1974 | Weikert . |
| 3,831,821 | 8/1974 | Doyen ................................. 222/255 |
| 3,837,353 | 9/1974 | Hopkin et al. ................... 137/391 X |
| 3,916,596 | 11/1975 | Adams et al. ...................... 53/493 X |
| 3,924,780 | 12/1975 | Elsworth .............................. 222/64 |
| 3,941,306 | 3/1976 | Weikert ............................ 229/69 X |
| 4,208,852 | 6/1980 | Pioch ..................................... 53/167 |
| 4,341,054 | 7/1982 | Courtheoux .......................... 53/268 |
| 4,341,329 | 7/1982 | Kuemmerer et al. .............. 222/275 |
| 4,509,313 | 4/1985 | Koppe .................................. 53/570 |
| 4,524,563 | 6/1985 | Sassi ..................................... 53/426 |
| 4,530,384 | 7/1985 | Boyes .................................... 141/95 |
| 4,593,730 | 6/1986 | Reil et al. ........................... 141/258 |
| 4,617,779 | 10/1986 | Nygren et al. ....................... 53/433 |

FOREIGN PATENT DOCUMENTS

| | | |
|---|---|---|
| 0104696 | 4/1984 | European Pat. Off. . |
| 1248011 | 10/1959 | France . |
| 1263280 | 4/1960 | France . |
| 2070888 | 9/1971 | France . |
| 2240866 | 3/1975 | France . |

OTHER PUBLICATIONS

Proceedings of the ISA Conference, "Variable Speed Pumping for Level Control", Advances in Instrumentation, vol. 36, Part 2, Annaheim, Calif., Oct. 6-8, pp. 27-44.

Primary Examiner—James F. Coan
Attorney, Agent, or Firm—Paul E. Schaafsma; Robert M. Barrett; Paul C. Flattery

[57] ABSTRACT

An apparatus for continuously filling flexible bags or pouches with a perfusion liquid contained in a reservoir to which the perfusion liquid is fed from a source.

The apparatus comprises regulating means including a sensor which sends a signal as a function of the level of the liquid in reservoir and is connected to a regulator that continuously regulates the feeding of the perfusion liquid to said reservoir, so as to maintain the level of the liquid in reservoir close to a pre-set level.

15 Claims, 1 Drawing Sheet

U.S. Patent          Dec. 19, 1989          4,887,411
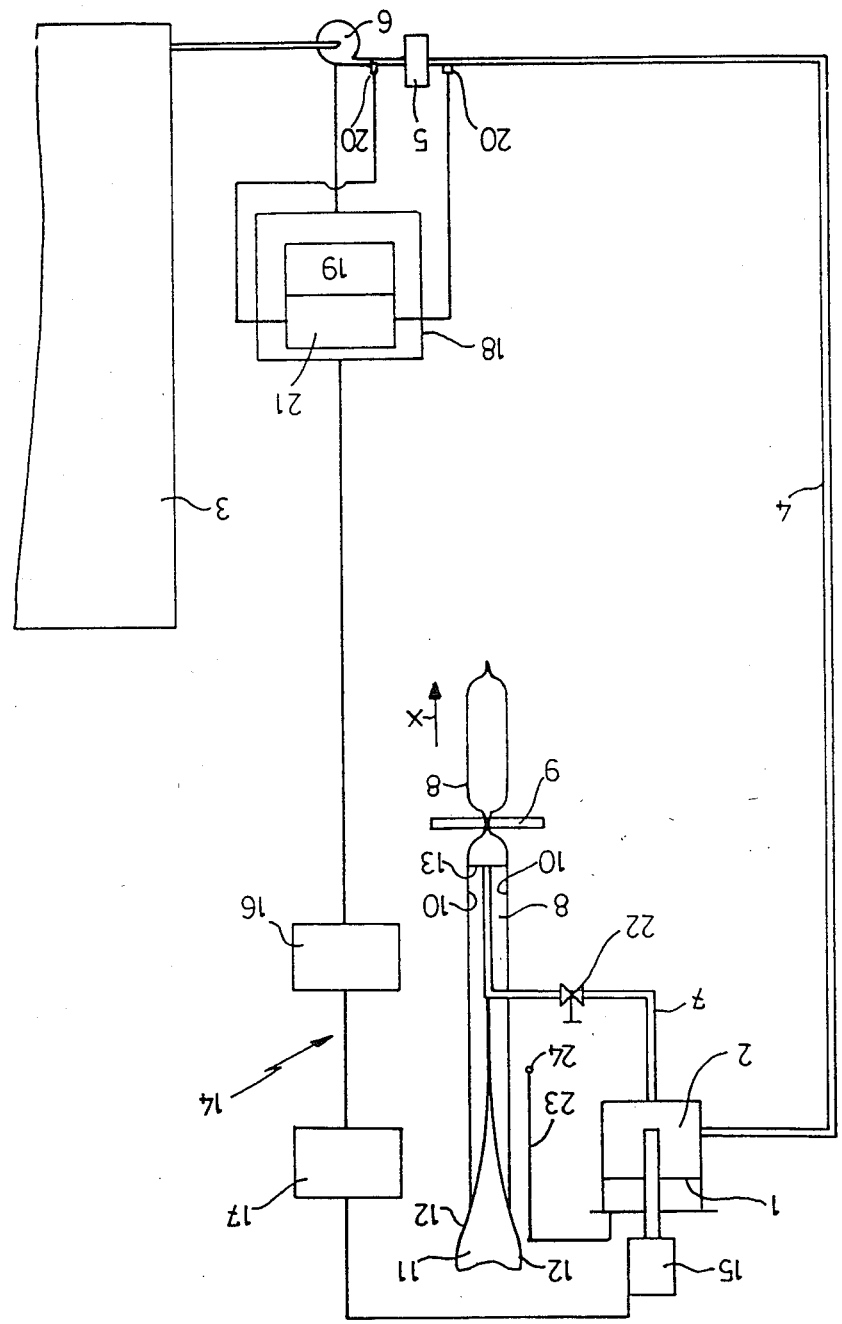

APPARATUS FOR FILLING BAGS OR POUCHES WITH A PERFUSION LIQUID

BACKGROUND OF THE INVENTION

The present invention relates to an apparatus for the continuous filling of flexible bags or pouches with a perfusion liquid from a source of such liquid, the apparatus including means for regulating the flow rate of the perfusion liquid coming from the reservoir, as a function of the liquid's level in the reservoir.

There is already known an apparatus of the type described above. In that known apparatus, which is mechanical in nature, the liquid level in the reservoir is maintained near a pre-set level, by means of a float that operates a valve or mechanism for closing the duct which feeds perfusion liquid to the reservoir.

The known apparatus however suffers several disadvantages. One disadvantage is that the apparatus does not allow the bags or pouches to be filled with a precise volume of perfusion liquid, especially when that liquid is viscous. Using the known apparatus provides inefficacious when the perfusion liquid contains more than 50% dextrose.

Moreover, the known mechanical device generates solid particles in the perfusion liquid, which may reach sizes that exceed those acceptable in the pharmaceutical field.

Furthermore, the volumes of perfusion liquid introduced into the bags or pouches may vary by as much as approximately 10% of the required volumes when the known mechanical apparatus is used.

The present invention remedies these drawbacks.

SUMMARY OF THE INVENTION

The present invention, provides an apparatus having regulating means including sensor which sends a signal as a function of the liquid level in the reservoir, and which is connected to a regulator that continuously regulates the feeding of the perfusion liquid to the reservoir, so as to maintain the liquid level in the reservoir near a pre-set level.

A feature of the invention is that the afore-mentioned regulator is a regulator with proportional, integral and derived action, which transforms a signal received from the sensor into a governing signal for a member feeding perfusion liquid to the reservoir, that member preferably being a device varying the speed of a pump which feeds perfusion liquid to the reservoir.

Another feature of the invention is that the sensor is connected to the transformer of the signal sent by that sensor into an electric current the intensity of which ranges between 0 to 20 milliamperes, which current is sent to the regulator.

Other features and advantages of the invention will be apparent from the following detailed description of the presently preferred embodiments and from of the drawing.

BRIEF DESCRIPTION OF THE DRAWING

The FIGURE illustrates a schematic representation of the apparatus of the present invention.

DETAILED DESCRIPTION OF THE PRESENTLY PREFERRED EMBODIMENTS

The apparatus of the present invention shown in the drawing is designed to maintain a level 1 approximately equal to a pre-set value inside a reservoir 2 or perfusion liquid.

The perfusion liquid is fed from a storage tank 3 and is brought into the reservoir 2 via a duct 4, after filtration through a filter 5 and with the aid of a pump 6.

The liquid contained in the reservoir 2 for this part is fed continuously by gravity through a duct 7 and into a bag or pouch 8.

A sealing mechanism 9 brings the internal walls 10 of the bag or pouch 8 against each other before sealing them together.

The desired volume of perfusion liquid is obtained by a full-cycle of the machine, which corresponds to the time necessary for the forward motion of the pouch or bag 8 in the direction indicated by arrow x, and the time necessary for the sealing together of the walls and for the moving away of the wall sealing mechanism from the walls 10 of the pouch 8.

The bags or pouches 8 are severed upon the opening of the sealing mechanism 9, that is to say when said mechanism moves away from walls 10 of the bag or pouch 8.

The bags or pouches 8 are created from a continuous sheet 11 of either polyethylene or polypropylene film, the lateral edges 12 of which are sealed to each other or on each other.

The rate of flow of the liquid entering the pouch is, among other things, a function of the viscosity of the liquid and of the level of liquid in the reservoir 2.

The rate of flow must be such that it is possible to fill the pouch 8 with a pre-set volume during a cycle of the sealing mechanism 9.

The apparatus of the invention makes possible without varying the speed of the intermittent forward motion (indicated by arrow x) of the bags or pouches 8, to fill with great accuracy those bags with transfusion liquids the viscosities of which may be different.

That speed of discontinuous forward motion of the bags or pouches requires the filling of those pouches to be carried out over a predetermined period of time. Therefore, the sole remaining parameter to maintain a constant rate of flow of a perfusion liquid having a given viscosity, is the height of the liquid level in the reservoir 2.

That level may be kept near a pre-determined value or mandatory level, by means of an automatic regulation device indicated by numeral 14.

The automatic device includes regulating means comprising a sensor 15 which sends an electric signal as a function of the liquid level in the reservoir 2 and which is connected to a regulator 16 which continuously regulates the supply to the reservoir 2 of perfusion liquid coming from the tank 3, so as to maintain the liquid level in the reservoir 2 near the mandatory level.

The sensor 15, preferably, is a capacity-type sensor, although it may also be a resistance-, thermal-, or piezo-electric-type sensor.

The capacity-type sensor 15 may include, in a manner known in itself, two concentric cylinders that serve as electrodes, the external cylinder having holes near its base allowing a free circulation of the liquid between the two cylinders. The sensor 15 determines an electric capacity which varies either in a linear or in a logarithmic manner with the liquid level in the reservoir 2.

The signal sent by the sensor 15 is modified by a transformer 17 into a current the intensity of which ranges between 0 and 20 milliamperes.

In a preferred embodiment, the transformer 17 modifies the signal sent by the sensor 15 into a current the intensity of which ranges between 4 to about 20 milliamperes, so as to alert the user of the possible stopping of the transformer 17.

The electric current sent by the transformer 17 is introduced into a regulator 16. The regulator 16 preferably is a continuous regulator with proportional, integral and derived action (PID) which measures the deviation between the level determined by sensor 15 and the mandatory value of that level. The PID regulator 16 produces a signal the intensity of which is partly proportional to the measured deviation, partly proportional to the integral of the deviation measured over time, and in part proportional to the derivative of the deviation measured over time.

The regulator 16 of the PID type allows the production of a signal which is sent into a member for the feeding of the reservoir 2, that member including a device 18 for varying the speed of the pump 6 which advantageously is a centrifuge pump.

The device 18 for varying the pump speed includes a converter 19 which transforms the signal coming from the regulator 16 into a variation in the speed of the pump 6, proportional to the rate of flow and to tolerance.

The filter 5 mounted inside the duct 4 downstream from the pump 6 and upstream from the reservoir 2, is inserted between two pressure sensors 20 which send electric signals to a device 21 that compensates for the loss of charge in the filter 5. The compensating unit 21 is mounted upstream from the converter 19 and downstream from regulator 16. The compensating unit 21 permits the regulation of the speed of the pump 6 as a function of the degree of clogging of the filter 5.

The filter 5 is designed to retain the solid particles present in the perfusion liquid at the exit of the pump.

The filter 5 makes it possible, because of its high loss of charge, to prevent any syphoning from either tank 2 or 3 toward the other tank 3 or 2 when the operation stops or starts.

Obviously, the PID regulator 16 may also take into consideration other parameters to maintain the level of the perfusion liquid near a pre-set value.

For example, the PID regulator 16 may receive a signal coming from a level sensor and a signal coming from a temperature sensor. The latter signal makes it possible to correct errors resulting from a change in the viscosity of the fluid or in its dielectric constant, with temperature.

Bag filling tests were carried out with an apparatus according to the present invention.

In that device, the signal sent by the capacity-type sensor 15 was modified in a transformer 17 into an electric current with an intensity ranging between 0 and 20 mA. That maximum current intensity corresponded to a maximum variation of the liquid level in reservoir 2, which was equal to 13.75 cm.

The PID type regulator 16 had a gain of 30% and a time differential of zero.

The device 18 for the variation of the rotation speed of the pump 6 had an acceleration and a deceleration time equal to 10 seconds. It received an electric signal with an intensity ranging between 0 and 20 mA, which, once transformed, made it possible to obtain a rotation speed for the pump 6 ranging between 0 and 3600 rpm.

A valve 22 was placed on the duct 7 allowing liquid to flow into the pouches 8. The valve 22 served to limit or stop the flow of liquid out of the reservoir 2, when the operation of the apparatus was stopped. The reservoir 2 had a vent 23 the end 24 of which was located inside a sterile atmosphere.

These tests were carried out for the filling of pouches or bags 8 with nominal capacities of 250, 500 and 1,000 milliliters, respectively.

Perfusion liquid was introduced into the 250 ml pouches. The response times of the regulator 16, at 1% of the mandatory value, were 20 seconds at the start of operations, and 10 seconds for passing from one mandatory value to another (deviation between mandatory values: 10%).

The pouches or bags with a nominal capacity of 250 ml received, on the average, 265,25 ml, to account for losses by evaporation during sterilization of the product, as well as for errors resulting from filling.

The typical deviation calculated for 200 pouches was 0.447 ml that is to say a variation of 0.168%.

A second series of tests on 200 pouches gave the following results:

| Average value of the content | 264.76 ml |
|---|---|
| Typical deviation | 0.575 ml |
| Variation (Typical deviation over average content) | 0.21% |

Filling tests for bags or pouches 8 having a 500 ml capacity were carried out with a regulator 16 which, at 1% of the mandatory value, had a response time of 6 seconds at the start of operation, and of 9 seconds for passing from one mandatory value to another.

The results obtained are set forth in Table I below:

TABLE I

| Test No. | Number of Pouches Tested | Maximum content ml | Minimum content ml | Average content ml |
|---|---|---|---|---|
| 1 | 172 | 535 | 525 | 526.82 |
| 2 | 100 | 531 | 529 | 529 |

| Test No. | Typ. Differ. ml | Variation % |
|---|---|---|
| 1 | 2.07 | 0.39 |
| 2 | 1.96 | 0.37 |

The last tests were carried out with pouches or bags 8 having a nominal capacity of 1,000 ml.

Results of those tests are set forth in Table II below:

TABLE II

| Number of Pouches Tested | Average content ml | Typical Difference ml | Variation % |
|---|---|---|---|
| 200 | 1036.8 | 4.78 | 0.46 |

The above described tests demonstrate that the variations in pouch content are surprisingly smaller less than 0.5%) when the apparatus of the invention is used than compared to prior known mechanical devices. Known mechanical devices frequently have variations that reach approximately 10%.

The apparatus of the invention provides a more accurate filing of the pouches, so that the ratio between the internal area of those pouches and the volume of liquid they contain is higher than the corresponding ratio obtained with the known device, for pouches having the same internal area.

The ability to withstand shock of the pouches or bags filled with the apparatus of the invention thus is definitely higher than that of the bags or pouches filled with the known mechanical device.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for continuously filling flexible bags or pouches with a perfusion liquid comprising: a reservoir that is fed perfusion liquid from a source of such liquid, means for regulating the rate of flow of the perfusion liquid coming out of the reservoir, as a function of the level of the perfusion liquid in the reservoir, a sensor mounted in the reservoir which sends an electronic signal that varies as a function of the perfusion liquid level in the reservoir, and a regulator electronically connected to the sensor for receiving the electronic signal, the regulator continuously regulating the feeding of perfusion liquid to said reservoir as a function of the electronic signal, the sensor and the regulator together operating to maintain the perfusion liquid level in reservoir near to a pre-set level.

2. An apparatus according to claim 1 wherein the regulator includes proportional, integral and derivative action, which transforms the electronic signal received from the sensor into a signal for governing a member for the feeding of the perfusion liquid to the reservoir.

3. An apparatus according to claim 2 wherein the member governs a pump for feeding the perfusion liquid to the reservoir.

4. An apparatus according to claim 3 wherein the member varies the speed of the pump.

5. An apparatus according to claim 1 wherein the sensor is a capacitance level sensor.

6. An apparatus according to claim 1 wherein the electronic signal sent by said sensor is an electric current having an intensity ranging between 0 to about 20 milliamperes, which current is sent to the regulator.

7. An apparatus according to claim 3 wherein the member includes a converter of the electronic signal coming from the regulator into a speed variation of the pump proportional to the rate of flow and to a predetermined tolerance.

8. An apparatus according to claim 3 including downstream from the pump a feeding reservoir, and upstream from the latter, a filter designed to hold back particles contained in the perfusion liquid.

9. An apparatus according to claim 8 including pressure sensors upstream and downstream from the filter, the sensors sending signals to a compensating device that compensates for a loss of charge in a filter, said compensating device being mounted upstream from the converter and downstream from the regulator.

10. An apparatus according to claim 3 wherein the pump is a centrifugal pump.

11. An apparatus for filling flexible bags with a liquid in a packaging machine comprising:
   a source of liquid;
   a reservoir, the liquid being fed from the source to the reservoir;
   means for regulating the rate of flow of the liquid coming out of the reservoir as a function of a level of the liquid in the reservoir, including a sensor for sensing the level of the liquid in the reservoir, the sensor being coupled to a regulator for regulating the flow of the liquid into the reservoir, the flow of the liquid into the reservoir being proportional to the level of the liquid in the reservoir.

12. The apparatus of claim 11 wherein the regulator is a regulator with proportional, integral, and derivative action.

13. The apparatus of claim 12 wherein the regulator governs a member that includes means for controlling a pump for feeding the liquid to the reservoir.

14. The apparatus of claim 13 wherein the member functions to vary the speed of the pump.

15. The apparatus of claim 11 wherein the sensor is a capacitance level sensor.

* * * * *